US010810603B2

(12) United States Patent
Ghosh et al.

(10) Patent No.: US 10,810,603 B2
(45) Date of Patent: Oct. 20, 2020

(54) SYSTEMS AND METHODS FOR DETERMINING CUSTOMER TRAFFIC DATA (71) Applicant: MasterCard International Incorporated, Purchase, NY (US)

(72) Inventors: Debashis Ghosh, Charlotte, NC (US); Manash Bhattacharjee, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 837 days.

(21) Appl. No.: 14/966,819

(22) Filed: Dec. 11, 2015

(65) Prior Publication Data
US 2017/0169441 A1 Jun. 15, 2017

(51) Int. Cl.
*G06Q 10/00* (2012.01)
*G06Q 30/02* (2012.01)

(52) U.S. Cl.
CPC ................ *G06Q 30/0201* (2013.01)

(58) Field of Classification Search
None
See application file for complete search history.

(56) References Cited

U.S. PATENT DOCUMENTS

| 8,457,354 B1* | 6/2013 | Kolar ............... G06K 9/00677 348/143 |
| 9,264,151 B1* | 2/2016 | Emigh ............... G06Q 30/0211 |
| 9,959,396 B2* | 5/2018 | Ortiz ............... G06F 21/10 |
| 2002/0065909 A1 | 5/2002 | Han |
| 2008/0026771 A1 | 1/2008 | Hill |
| 2010/0057532 A1* | 3/2010 | Sanguinetti ............ G06Q 30/02 705/7.29 |
| 2010/0130165 A1* | 5/2010 | Snyder ............... H04W 12/1206 455/410 |
| 2011/0072132 A1* | 3/2011 | Shafer ............... G06Q 10/087 709/224 |

(Continued)

OTHER PUBLICATIONS

Stephanie Clifford and Quentin Hardy, Attention, Shoppers: Store is Tracking Your Cell, Jul. 14, 2013 https://nyti.ms/15eaRaD (Year: 2013).*

*Primary Examiner* — Rutao Wu
*Assistant Examiner* — Matheus Stivaletti
(74) *Attorney, Agent, or Firm* — Armstrong Teasdale LLP (57) ABSTRACT

A method and device for analyzing customer traffic data at a merchant location are provided. The method may include transmitting pings within a coverage area of a wireless network provided by the merchant computer, receiving ping responses from one or more customer devices corresponding to one or more customers located within the coverage area of the wireless network provided by the merchant computer, extracting a unique device identifier from each received ping response over a period of time, each of the unique device identifiers identifying a different customer device that transmitted the ping response, estimating an amount of customer traffic at the merchant location, over the period of time, based on the unique device identifiers extracted during the period of time, and outputting an indication of the estimated amount of customer activity at the merchant location over the period of time.

13 Claims, 3 Drawing Sheets

(56) References Cited

U.S. PATENT DOCUMENTS

| | | | |
|---|---|---|---|
| 2011/0225076 A1* | 9/2011 | Wang | G06Q 40/02 705/35 |
| 2012/0239574 A1* | 9/2012 | Smith | G06Q 20/4014 705/44 |
| 2012/0289209 A1* | 11/2012 | Crawford | H04W 4/21 455/414.1 |
| 2013/0013689 A1* | 1/2013 | Crawford | H04W 4/021 709/204 |
| 2013/0217332 A1* | 8/2013 | Altman | H04H 60/90 455/41.2 |
| 2013/0346237 A1* | 12/2013 | Rademaker | G06Q 10/0836 705/26.8 |
| 2014/0089190 A1* | 3/2014 | Vedabrata | G06Q 40/02 705/44 |
| 2014/0114780 A1 | 4/2014 | Menefee et al. | |
| 2014/0164124 A1* | 6/2014 | Rhoads | G06Q 30/0261 705/14.58 |
| 2014/0188568 A1 | 7/2014 | Margolin | |
| 2014/0207584 A1* | 7/2014 | Wicha | G06Q 30/0276 705/14.72 |
| 2014/0214489 A1* | 7/2014 | Bedi | G06Q 30/0203 705/7.32 |
| 2014/0351098 A1* | 11/2014 | Shafer | G06Q 10/087 705/28 |
| 2015/0100383 A1 | 4/2015 | Chauhan | |
| 2015/0193775 A1* | 7/2015 | Douglas | G06Q 30/0253 705/14.23 |
| 2016/0180258 A1* | 6/2016 | Walz | G06O 30/0231 705/5 |
| 2016/0183051 A1* | 6/2016 | Nack | H04W 4/21 705/14.58 |
| 2016/0192216 A1* | 6/2016 | Govindarajan | H04W 24/04 705/7.28 |
| 2017/0169444 A1* | 6/2017 | Housholder | G06Q 30/0261 |
| 2017/0206571 A1* | 7/2017 | Dhawan | G06Q 30/0255 |

* cited by examiner

SYSTEMS AND METHODS FOR DETERMINING CUSTOMER TRAFFIC DATA

BACKGROUND

The present application relates generally to a technology that may be used to determine traffic data, and more particularly, to network-based systems and methods for analyzing and calculating customer traffic at a merchant location using a wireless network provided by the merchant.

Merchants are at least sometimes interested in a number of customers that visit the merchant's location for a given period of time. In some cases, merchants may use an amount of payment transaction occurrences processed at a merchant location as a method of estimating customer traffic. For example, a merchant may track the amount of payment transactions made using payment accounts such as credit cards, debit cards, and the like. However, not everyone who visits a merchant store ends up buying an item from the respective store. In this example, when someone visits a merchant store but does not purchase anything at the store, they do not generate a transaction. As a result, most merchants are underestimating an amount of customer traffic that occurs at their locations.

In today's society, many merchants offer WiFi connections to their customers or utilize WiFi connections to operate their business. Examples of businesses offering or using WiFi include restaurants, coffee shops, hotels, supply stores, and the like. People may gather at merchants offering WiFi, for example, to attend a social meeting with friends and/or family, to meet a co-worker, to check email, and the like. As a non-limiting example, people often gather at merchants such as STARBUCKS®, PANERA BREAD®, MCDONALDS®, CARIBOU COFFEE®, and the like, that offer free WiFi, however, they may arrive without any intention of making a purchase from the merchant. As another example, people also tend to gather at hotels, however, they are not paying customers who are staying at the hotel but are merely visiting other guests, attending a conference, and the like. In these examples, many people that enter a merchant location that offers WiFi will avail themselves of the WiFi even if they do not make a purchase from the merchant.

In one known system offered by Motionloft, customers are physically counted as they enter and/or leave a merchant location using imaging hardware installed at a doorway or other area of a merchant location. However, this system typically requires a clear line of sight between the imaging equipment and the customer. As a result, people may be missed as they pass by the imaging equipment if there is not a clear line of sight. Also, systems such as these can be costly, and can require significant equipment purchases.

Accordingly, a system and method for monitoring customer traffic that does not require excessive hardware installation and maintenance is desired. It is also desirable for a system that is able to keep track of how much time a particular person is located at a merchant location.

BRIEF DESCRIPTION OF THE DISCLOSURE

In one aspect, a computer-implemented method for analyzing customer traffic data at a merchant location is provided. The method is implemented using a traffic analyzing computing device. The method may include periodically transmitting pings within a coverage area of a wireless network provided by the merchant computer, in response to the transmitting, receiving ping responses from one or more customer devices corresponding to one or more customers located within the coverage area of the wireless network provided by the merchant computer, extracting a unique device identifier from each received ping response over a period of time, each of the unique device identifiers identifying a different customer device that transmitted the ping response, estimating an amount of customer traffic at the merchant location, over the period of time, based on the unique device identifiers extracted during the period of time, and outputting an indication of the estimated amount of customer activity at the merchant location over the period of time.

In another aspect, a customer traffic analyzing computing device is provided. The customer traffic analyzing computing device may include a transmitter configured to periodically transmit pings within a coverage area of a wireless network provided by a merchant computer, a receiver configured to receive ping responses from one or more customer devices corresponding to one or more customers located within the coverage area of the wireless network provided by the merchant computer, an analyzer configured to extract a unique device identifier from each received ping response over a period of time, each of the unique device identifiers identifying a different customer device that transmitted the ping response, a processor configured to estimate an amount of customer traffic at the merchant location, over the period of time, based on the unique device identifiers extracted during the period of time, and a display configured to output an indication of the estimated amount of customer activity at the merchant location over the period of time.

In another aspect, a non-transitory computer-readable storage medium having computer-executable instructions embodied thereon that, when executed, cause a computer to perform a method for analyzing customer traffic data at a merchant location is provided. The computer-performed method may include periodically transmitting pings within a coverage area of a wireless network provided by the merchant computer, in response to the transmitting, receiving ping responses from one or more customer devices corresponding to one or more customers located within the coverage area of the wireless network provided by the merchant computer, extracting a unique device identifier from each received ping response over a period of time, each of the unique device identifiers identifying a different customer device that transmitted the ping response, estimating an amount of customer traffic at the merchant location, over the period of time, based on the unique device identifiers extracted during the period of time, and outputting an indication of the estimated amount of customer activity at the merchant location over the period of time.

DETAILED DESCRIPTION OF THE DISCLOSURE

The present embodiments relate to analyzing and calculating customer traffic at a merchant location by using a pre-existing infrastructure such as a wireless network offered and/or used by the merchant in order to sense one or more devices that are present within the merchant location or present within a vicinity of the merchant location. According to various aspects, a merchant computer may transmit pings throughout a coverage area of a wireless network offered by or associated with the merchant computer. Customer devices present within the merchant location, or present within a coverage area or transmission distance of the merchant computer, may respond to the ping messages with a unique device identifier of the customer device. Accordingly, the merchant computer may analyze the ping responses and detect an amount of customer devices that are present within the coverage area of the wireless network and estimate customer traffic at the merchant location based on the amount of detected customer devices.

Being able to accurately estimate customer traffic is a useful metric for a merchant. For example, a merchant may determine what time of the day, what day of the week, what point of the year, and the like, when they are the busiest or the slowest. Accordingly, a merchant may provide sales, coupons, and the like, in an effort to attract customers to the merchant location at times when they are not as busy. Merchants may also attempt to retain customers through various promotions and activities at times when they are busiest. As another example, customer traffic may be used as a factor in calculating a property appraisal for commercial real estate.

By using a pre-existing infrastructure, the systems and methods described herein are capable of being up and running within a short period of time and without a need to install excessive additional hardware at the merchant location. Furthermore, the duration that a customer or potential customer spends at a merchant location may be more accurately determined, and confusion as to whether a customer was already counted as being present at the location may be prevented. Also, the systems and methods herein may analyze the customer traffic data and calculate spending profiles and other financial information about customers.

According to various aspects, customer traffic data may be detected by a customer traffic analyzing computing device ("computing device"), for example, a server, a wireless router, and the like, may be configured to function as described herein. As an example, the computing device may be a merchant computing device such as a merchant server that provides access to a wireless network to customers, such as a WiFi network, and the like. As another example, the computing device may be coupled to a merchant server that provides wireless network access to customers.

The computing device may generate and send pings to customer devices that are connected to the wireless network offered by the merchant. For example, a ping may refer to a request, query, and the like, transmitted through a network. A transmitted ping may include one or more packets (e.g., an echo request packet) having a format such as an Internet Control Message Protocol (ICMP). A ping may also be used to measure a round-trip time from a transmission device to a reception device. In response to receiving a ping, a reception device may transmit a reply message (e.g., an echo reply packet) in response to the ping. Through the ping response, a customer device may feed back or respond with a message or a signal including a unique device identifier of the customer device. The unique device identifier may include a medium access protocol (MAC) identification (MAC ID) that is unique to the customer device, and the like. Based on the amount of MAC IDs received through the ping responses, the computing device may determine an amount of customers located at or near the merchant location. For example, the number of MAC IDs may be used as an estimation of the number of customers. Accordingly, even if a customer does not make a purchase from the merchant, or a customer makes a purchase with a payment card that initiates a transaction over a different payment processor, a presence of the customer at the merchant location may be determined based on the ping sent from the merchant computer and the ping response from the customer device. Furthermore, based on the responses received, the computing device may analyze the customer traffic and may calculate or estimate one or more financial profiles of the customers.

The coverage area of a wireless network provided by a merchant may extend beyond the barriers of the merchant location or the merchant store. In other words, the coverage area may extend beyond the walls of the establishment into other areas, for example, sidewalks, patios, common areas, walkways, and the like. Also, the coverage area of the wireless network may be modified by a merchant in order to cover areas only within boundaries of the merchant location, to cover areas beyond the boundaries of the merchant location, to cover partial areas within the boundaries of the merchant location, and the like. Accordingly, the computing device may detect devices of potential customers that are located within the vicinity of the merchant location, but not actually inside of the merchant location. For example, a customer device may manually connect to a wireless network offered by a merchant. Here, the customer may enter logon credentials in order to gain access to the wireless network. As another example, a customer device may automatically connect to the wireless network offered by the merchant without a user input. For example, a setting of a customer device may be set to automatically connect to an available wireless network. As another example, a customer may have previously visited the merchant location and accessed the wireless network. Accordingly, the customer device may remember the wireless network (which may include logon credentials) and the customer device may automatically connect to the wireless network.

In some examples, the computing device may analyze the ping responses and determine various characteristics about the customer device. For example, based on a unique device identifier included in a ping response the computing device may determine a type of the device that transmitted the ping response, a manufacturer of the device, a brand name of the device, a model type of the device, and the like. As another example, based on the unique device identifier included in the ping response the computing device may determine a web browser used by the customer device, and the like. In addition, the computing device may analyze the device characteristics and estimate customer data about a customer corresponding to the customer device. For example, the computing device may estimate spending habits of a customer, spending preferences of a customer, a spending profile of the customer, and the like.

Example of a Customer Traffic Analyzing System

Figure 1:
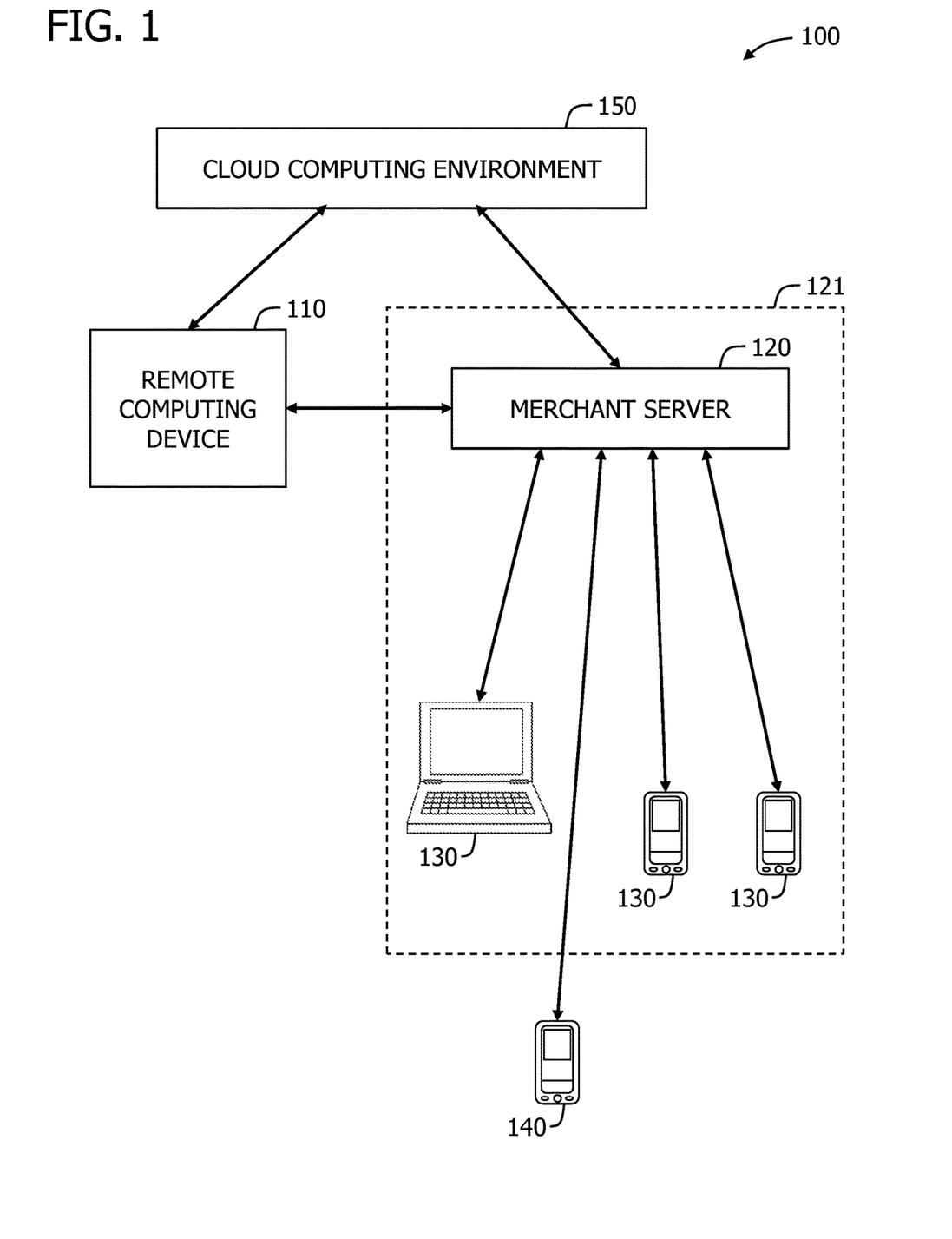
FIG. 1 is a diagram illustrating an example of a system for analyzing customer traffic at a merchant location in accordance with an example embodiment of the present disclosure.

FIG. 1 is a diagram illustrating an example of a system 100 for analyzing customer traffic at a merchant location in accordance with an example embodiment of the present disclosure.

Referring to FIG. 1, system 100 includes a merchant server 120, a remote computing device 110, and a cloud computing environment 150. The merchant server 120, remote computing device 110, and cloud computing environment 150 may be connected to one another via one or more networks such as the Internet. Accordingly, using a pre-existing infrastructure such as a wireless network offered by a merchant server, the examples herein may be implemented to detect an amount of customer traffic at the location of the merchant server 120. As a non-limiting example, the remote computing device 110 may be a computing device associated with a payment processor, for example, MASTERCARD®, and the like. Also, both the remote computing device 110 and the merchant server 120 may access cloud computing environment 150. As a non-limiting example, the cloud computing environment 150 may be incorporated with transaction data in a payment network system of a payment processor or alternately be used as a standalone system.

According to various aspects, the remote computing device 110 may transmit instructions to the merchant server 120 which may be installed by the merchant server 120. For example, the instructions may be used to detect an amount of customer traffic. Here, the instructions may include software, firmware, and the like. In response to receiving the instructions, the merchant server 120 may install the instructions and perform customer traffic detection, examples of which are further provided herein. The merchant server 120 may store the customer traffic data in a storage thereof (not shown) and/or it may transmit the detected customer traffic data to one or more of the remote computing device 110 and the clouding computing environment 150. Accordingly, at least one of the merchant server 120, the remote computing device 110, and the cloud computing environment 150 may analyze the customer traffic. For ease of description, the example of FIG. 1 is described as if the merchant server 120 is analyzing the customer traffic data, however, it should be appreciated that another computing device may analyze the customer traffic data such as the remote computing device 110 and the cloud computing environment 150, or another device.

For example, the merchant server 120 may gather raw customer traffic data and analyze the raw customer traffic data. According to various examples, the merchant server 120 may include, may be coupled to, may be connected to, or otherwise, may communicate with a wireless networking device, for example, a router, a hub, a switch, a gateway, and the like. For example, the merchant server 120 (via the wireless networking device) may generate a wireless network and gather the raw customer traffic data by transmitting pings and receiving ping responses from customer devices connected to the wireless network. The merchant server 120 may estimate an amount of customer traffic at the merchant location based on the analyzed customer traffic data. The merchant server 120 may transmit the raw customer traffic data and/or the analyzed customer traffic data to the cloud computing environment 150 and/or the remote computing device 110, so that the raw customer traffic data can be further analyzed. As another example, the merchant server 120 may upload the raw customer traffic data to the cloud computing environment 150 where the remote computing device 110 may access the raw customer traffic data to further analyze the customer traffic.

In the example of FIG. 1, the merchant corresponding to the merchant server 120 includes a location that has a physical boundary 121. A customer may enter the boundary 121 of the merchant location to purchase items from the merchant. As used herein, the term "items" may refer to goods and/or services. In this example, the plurality of customer devices may include customer devices 130 that are located within the boundary 121 of the merchant store, and customer device 140 (i.e., a potential customer) located within a coverage area of a wireless network provided by the merchant but outside of the boundary 121 of the merchant location. Accordingly, merchant server 120 may transmit pings to customer devices 130 and the potential customer device 140. For example, the pings may be transmitted by a router, a hub, a switch, a gateway, and the like, of the merchant server 120. The pings may be transmitted periodically, randomly, in response to a triggering event, and the like. For example, the pings may be transmitted every 5 seconds, every 15 seconds, every minute, every 20 minutes, every hour, randomly, or by a user settable time interval, and the like. By transmitting pings more often, the amount of time the customer spends at the merchant location may be more precisely determined. For example, by decreasing an interval at which pings are transmitted, the interval at which the merchant server 120 receives ping responses may also be decreased. Accordingly, a point in time at which the customer device leaves the merchant location may be more accurately estimated due to the shorter intervals of time. As another example, one or more of the remote computing device 110 and cloud computing environment 150 may trigger the merchant server 120 to transmit pings to the customer devices 130 and 140. Here, a customer device 130 and 140 may be, for example, a computer, a laptop computer, a tablet, a smart phone, a personal digital assistant, a gaming device, an MP3 player, and the like.

In response to the pings being transmitted from the merchant server 120, customer devices 130 and potential customer device 140 may transmit ping responses to the merchant server 120. In this example, the merchant server 120 (e.g., wireless network device of the merchant server 120) may receive the ping responses. For example, the ping responses may include unique IDs of the customer devices 130 and 140 such as MAC IDs, and the like. In some examples, the ping responses include only the unique device identifier of the customer device such as the MAC ID without including any personally identifiable information (PII). That is, the ping response may not include data that would identify a specific individual (sometimes referred to as Personally Identifiable Information, or PII), but only identifies a device as being unique. In this way, individuals privacy is maintained. In another example, the ping response may include the unique device identifier and additional data, for example, device information, network information, personal information, and the like.

According to various examples, multiple pings may be transmitted to the customer devices. Each time a customer device responds to a ping, the customer device may include its unique device identifier thereof in the response. As an example, when the merchant server 120 receives a second ping response (i.e., an additional ping response) with a MAC ID that is the same as a MAC ID of a ping response previously received, the merchant server 120 determines that the ping response is being repeated by a customer device. Based on the timing of ping responses received having the same MAC ID, the merchant server 120 may determine how long a customer is present at the merchant location, for example, based on when the ping responses from a customer device (i.e., MAC ID) begin and when the ping responses stop being received.

After a predetermined period of time, for example, a day, an hour, a week, and the like, the merchant server 120 may analyze the ping responses from the customer devices to determine customer traffic data. As a result, the merchant server 120 may determine one or more times of the day when traffic is heavy, one or more times of the week when traffic is heavy, an ratio of customers that are making purchases in comparison to a ratio of customers that are not making purchases, and the like. As another example, the merchant server 120 may analyze the ping responses in real-time. For example, the merchant server 120 may determine in real-time that an amount of customers has increased or decreased and suggest that the merchant react accordingly. Also, the merchant server 120 may transmit the ping response data to the remote computing device 110 and/or the cloud computing environment 150 where customer traffic may be analyzed.

Based on the analyzed customer traffic data, customer traffic estimations may be calculated and provided to the merchant associated with the merchant server 120. For example, the amount of customer devices located at or near the merchant location may be estimated over a function of time. In this example, a two-dimensional graph of an amount of customer devices may be provided with one axis being represented by an amount of customer devices and the other axis being represented with respect to time. For example, customer traffic data may be output on a display of the merchant server 120, output to another computing device associated with the merchant, output to the remote computing device 110, output to the cloud computing environment 150 where it can be further accessed by the merchant or by the remote computing device 110, and the like.

The wireless network provided by the merchant server 120 may be a WiFi network. For example, the wireless network may include one or more of a local area network (LAN), a wireless local area network (WLAN), a private network, a public network, and the like. To distribute the wireless network, the merchant server 120 may be in wireless communication with one or more network devices, for example, a router, a small cell, a switch, another network, and the like. It should be appreciated that the examples herein are not limited to a specific network construction or specific network devices.

Example of Customer Traffic Analyzing Computing Device

Figure 2:
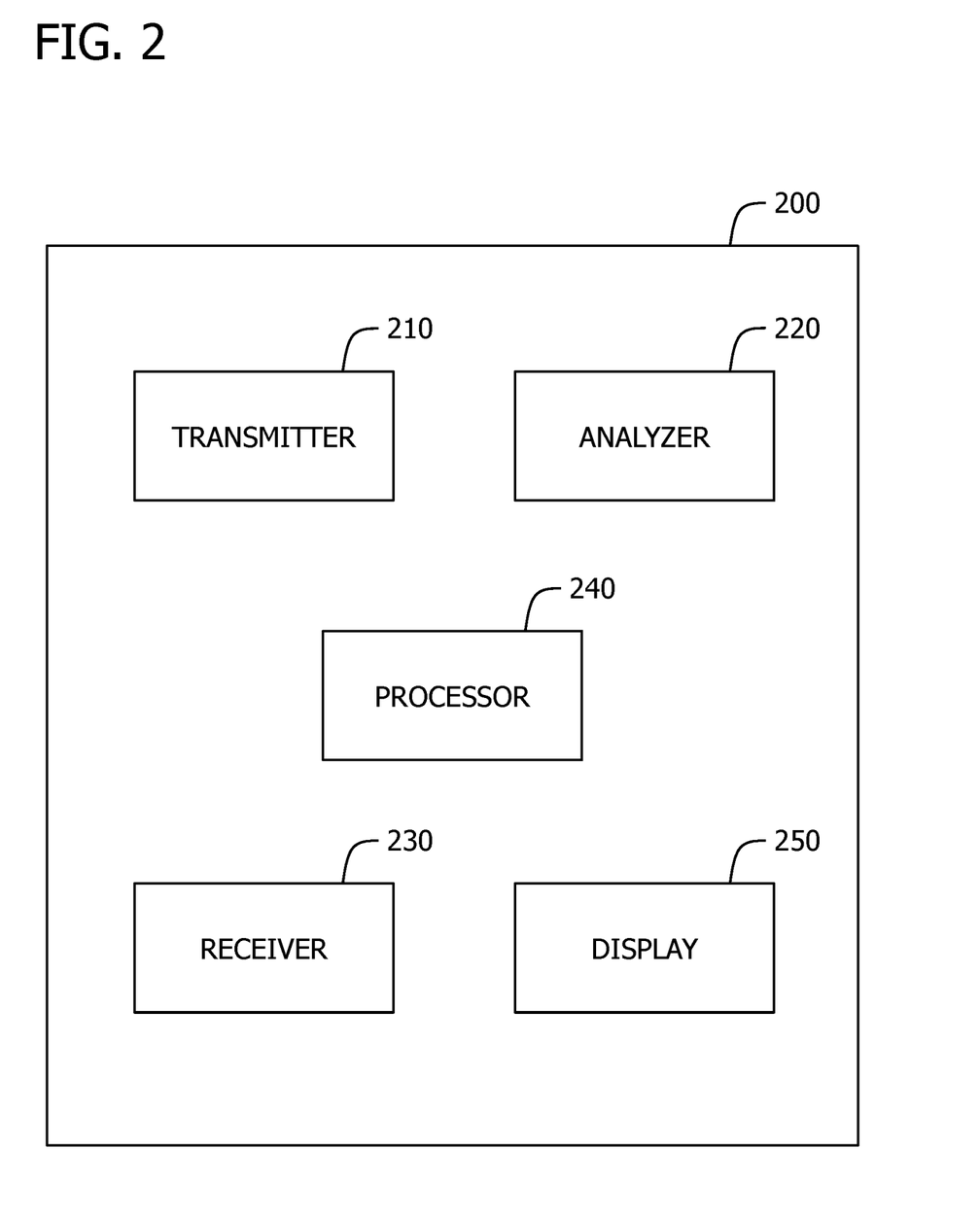
FIG. 2 is a diagram illustrating an example of a customer traffic analyzing computing device in accordance with an example embodiment of the present disclosure.

FIG. 2 is a diagram illustrating an example of a customer traffic analyzing computing device in accordance with an example embodiment of the present disclosure.

Referring to FIG. 2, customer traffic analyzing device 200 ("computing device 200") includes a transmitter 210, an analyzer 220, a receiver 230, a processor 240, and a display 250. For example, the customer traffic analyzing device 200 may be, for example, a computer, a server, a laptop, a tablet, a mobile phone, and the like that has been specifically configured to function as described herein. Also, although described individually, one or more of the transmitter 210, the analyzer 220, and the receiver 230 may be combined with the processor 240.

The transmitter 210 may transmit ping messages to one or more devices that are connected to a wireless network which the computing device 200 is also connected to. For example, the transmitter 210 may broadcast pings through the wireless network. As another example, the transmitter 210 may transmit (e.g., unicast) pings directly to devices connected to the wireless network. The transmitter 210 may be configured to transmit the pings periodically, randomly, responsively to a triggering event, and the like. For example, the transmitter 210 may periodically transmit pings within a coverage area of a wireless network provided by a merchant computer every 5 seconds, every 15 seconds, every minute, every 20 minutes, every hour, and the like. As another example, a remote computing device may trigger the computing device 200 to transmit pings.

The transmitter 210 may transmit pings to devices located within a merchant location and/or devices located outside a merchant location but within a service range or a coverage area of the wireless network provided by the merchant computer. Also, in some cases, the computing device 200 may be part of or included in the merchant computer, or may be coupled to the merchant computer. For example, the computing device 200 may be unaware of the positions at which customer devices are located or whether a device is located within a merchant location or outside of the merchant location. Regardless, the transmitter 210 may transmit a ping to all customer devices and potential customer devices, which herein may be referred to generally as customer devices, which are located within a coverage area of the wireless network of the merchant computer and/or a transmission range of the transmitter 210.

The receiver 230 may receive ping responses from a plurality of customer devices corresponding to a plurality of customers. Here, the plurality of customer devices may be those customer devices that are located within the coverage area of the wireless network provided by the merchant computer and/or within the transmission range of the transmitter 210. The receiver 230 may also receive data from additional networks besides the wireless network offered by the merchant. For example, the receiver 230 may receive data through the Internet, through a cellular connection, through a cable connection, a satellite connection, and the like. In the example of FIG. 2, the transmitter 210 and the receiver 230 may be included in a wireless networking device connected to, coupled to, or included in the customer traffic analyzing device 200. For example, the wireless networking device may include a router, a hub, a switch, a gateway, and the like, which are capable of communicating through a wireless network.

The analyzer 220 may extract a unique device identifier from each ping response. Therefore, if ping responses are received from a plurality of customer devices, the analyzer 220 may extract a unique device identifier from each ping response from among the plurality of ping responses. As a result, the unique device identifier of each customer device that transmitted a ping response may be extracted and analyzed. Also, the analyzer 220 may continue to extract unique device identifiers from ping responses over a period of time. The device identifier may include a MAC ID. For example, the MAC ID may be a MAC address that is a globally unique identifier assigned to a network device or interface and may also be referred to as a hardware address or a physical address. A MAC address is typically 6 bytes (48 bits) in length and is used as a network address for most Institute of Electrical and Electronics Engineers (IEEE) 802 network technologies, including Ethernet and WiFi. A MAC address is typically assigned by a manufacturer of a network interface controller (NIC) included in the customer device.

The processor 240 may estimate an amount of customer traffic at the merchant location, over a period of time, based on the unique device identifiers extracted during the period of time. For example, the processor 240 may estimate the amount of customer traffic by grouping together ping responses received during the period of time that have a same unique device identifier, and estimate an amount of time that a customer device corresponding to the same unique device identifier spends at the merchant location based on time stamps included in the grouped ping responses. The processor 240 may group ping responses together for each respective customer device and estimate an amount of time that each respective customer device spends at the merchant location. Also, using the estimated amount of time that each customer spends at the merchant location during the period of time, the processor 240 may average the estimated amount of times of each customer device to determine an average amount of time a customer spends at the merchant location. In other words, the amount of time each customers spends at the merchant location may be aggregated together to form an average amount of time. The processor 240 may remotely store the estimated customer activity that occurs at the merchant location over the period of time in a cloud computing environment or other remote storage location. Also, the processor 240 may transmit the estimated customer activity to another computing device.

The processor 240 may calculate an amount of customers present in the coverage area of the wireless network of the merchant location at a time of the day, day of the week, and the like. For example, the processor may create a graph of customers versus time and output the graph to be received by the merchant. The processor 240 may also create a user interactive display that a user may interact with to display customer traffic metrics and information.

The processor 240 may determine device information of a customer device based on a unique device identifier extracted from a ping response corresponding to the customer device. For example, the processor 240 may determine a manufacturer of and a model of the customer device. As a non-limiting example, the processor 240 may determine that a customer device is an APPLE IPHONE®, a SAMSUNG GALAXY®, a MOTOROLA DROID®, and the like. Also, the processor 240 may determine a web browser being used by the customer device.

In some examples, the processor 240 may calculate customer information based on the determined device information. For example, the processor 240 may calculate spending profile data about a customer based on device information of a customer device corresponding to the customer. For example, a customer who owns or uses a particular customer device may be determined as someone likely to be more conservative with their spending, less conservative with their spending, and the like. Also, the processor 240 may determine whether a customer is more likely to spend money based on the device information. For example, a customer using an ACER CHROMEBOOK® may be determined as more likely to spend money than a customer using an APPLE IPHONE®.

The display 250 may output or display an indication of the estimated customer activity at the merchant location over the period of time. Here, the display 250 may be any type of desired display, or may be a combination of a display and an input unit, such as a touch display. Also, although not mentioned, the computing device 200 may further include an input unit such as a keyboard, mouse, speech recognition module, object recognition module, and the like.

Example of a Method for Analyzing Customer Traffic

Figure 3:
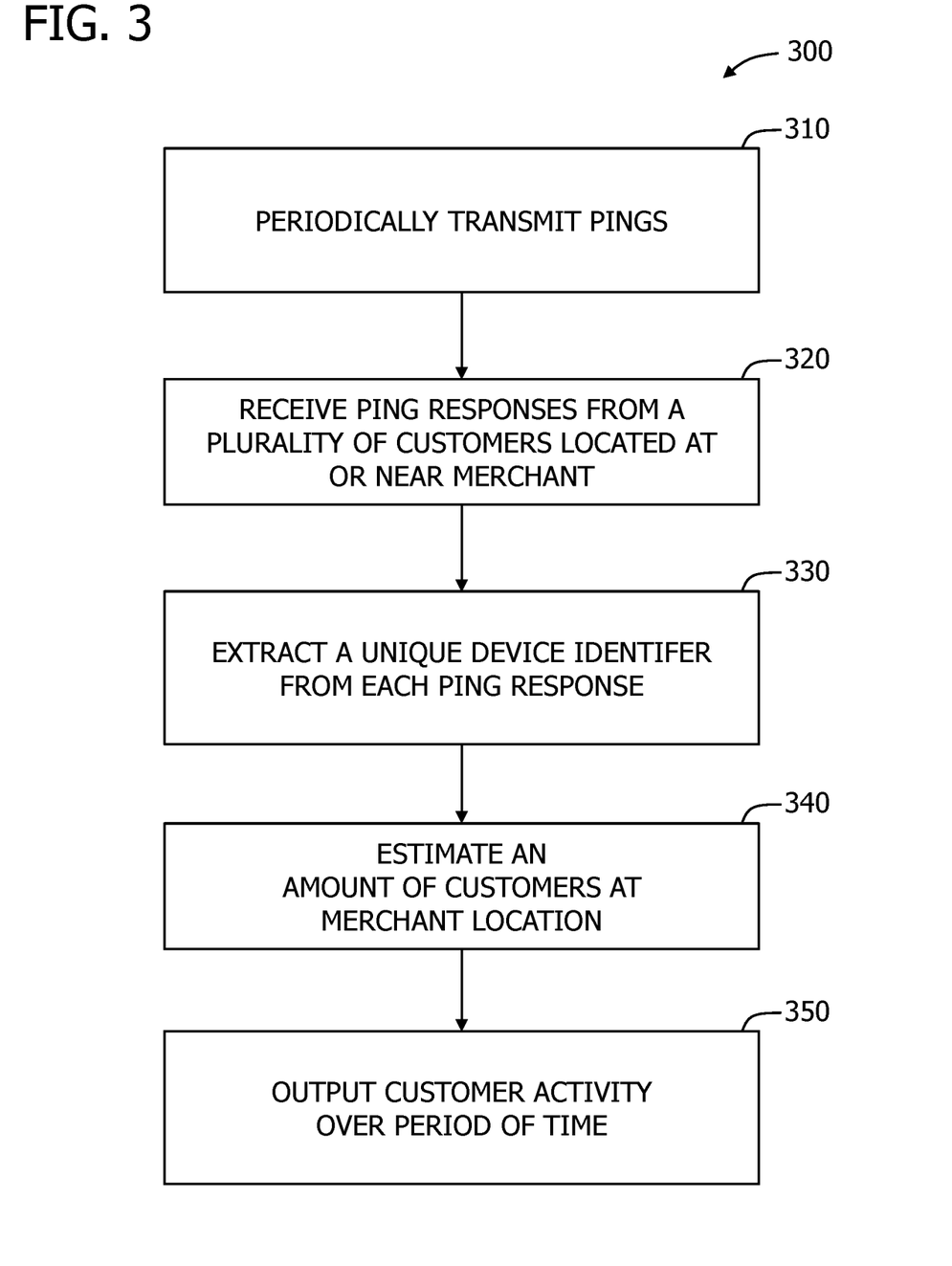
FIG. 3 is a diagram illustrating an example of a method for analyzing customer traffic at a merchant location in accordance with an example embodiment of the present disclosure.

FIG. 3 is a diagram illustrating an example of a method for analyzing customer traffic at a merchant location in accordance with an example embodiment of the present disclosure.

Referring to FIG. 3, method 300 includes periodically transmitting pings within a coverage area of a wireless network provided by the merchant computer, in 310. For example, the pings may be broadcast or unicast within a coverage area and/or a transmission distance of a merchant computer. The pings may be transmitted periodically, randomly, responsively to a triggering event, and the like.

At 320, the method 300 includes, in response to the transmitting, receiving ping responses from a plurality of customer devices corresponding to a plurality of customers located within the coverage area of the wireless network provided by the merchant computer. For example, customer devices may transmit a response message or signal which may be received at 320.

Method 300 further includes, at 330, extracting a unique device identifier from each ping response from among a plurality of ping responses received over a period of time, each unique device identifier identifying a customer device that transmitted the ping response. For example, the unique device identifier may be a MAC ID or MAC address that is unique to a device.

At 340, the method 300 includes estimating an amount of customer traffic at the merchant location, over the period of time, based on the unique device identifiers extracted during the period of time. For example, the customer traffic may be estimated over a period of time, for example, a day, a week, an hour, and the like. As another example, the customer traffic may be estimated in real-time. Furthermore, in 350 the method 300 includes outputting an indication of the estimated customer activity at the merchant location over the period of time.

The computing device of claim 10, wherein the processor is further configured to calculate a merchant stability score based on a plurality of merchant analytics including an analytic for the estimated customer activity at the merchant location over the period of time

Customer Traffic May be Used for Determining a Stability Score for a Merchant In some examples, the customer traffic may be converted to a metric and be used as an analytic in merchant stability estimation or calculation. For example, the customer traffic analytic may be one of a plurality of analytics that are used to process and calculate a merchant stability score indicating how financially stable a merchant is estimated to be. An example of calculating a merchant stability score is described with respect to U.S. patent application Ser. No. 14/881,244, filed on Oct. 13, 2015, which is hereby incorporated by reference in its entirety.

The merchant analytics computing device may generate multiple merchant analytics for each merchant and may generate "aggregated merchant analytics" for a merchant and/or for a sector including a plurality of merchants. Aggregated merchant analytics refer generally to an average, weighted average, or any other aggregation of individual merchant analytics generated for merchants located in the sector. For example, the "merchant analytics" may include at least one of a growth score, a customer traffic score, a stability score, a size score, a ticket size score, a transaction traffic score, and a composite score for each sector.

In various examples, a "growth score" is a ranking of the growth of the sector relative to other sectors in the geographic region, wherein "growth" refers generally to sales revenue growth over a period of time. A "stability score" is a ranking of the stability of the sector, wherein "stability" refers generally to maintenance of sales revenue within a range of sales revenues around an average. A "size score" is a ranking of the size of the sector, wherein "size" refers generally to total sales revenue. A "traffic score" is a ranking of the traffic of the sector, wherein "transaction traffic" refers generally to a number of monthly transactions. A "ticket size score" is a ranking of the ticket size of the sector, wherein "ticket size" refers generally to a transaction amount, and may be calculated by dividing the size by the traffic (i.e., dividing sales revenue by the number of transactions). A "composite score" is a composite of the previous five scores (growth, stability, size, traffic, and ticket size), to provide an overall ranking of the sector. Where the general term "score" without a modifier is used herein, it may refer collectively to any or all of the preceding scores to describe characteristics shared by some or all of the scores. Each of these scores (collectively "analytics") may be generated for each merchant within a sector and may be subsequently aggregated to generate aggregated merchant analytics for the sector.

In the example embodiment, the score may be normalized to be between 0 and 1,000, 0 and 100, 0 and 10, and the like. In some embodiments, a higher score indicates a "better" sector (i.e., a higher relative ranking). For example, a sector with a score of 800 may rank higher on any or all of the above-described factors than a sector with a score of 300. A "better" sector refers to a sector that is preferred over other sectors (or is performing better) based upon the financial transactions performed at merchants located within that sector.

In the example embodiment, a merchant analytics computing device may receive transaction data associated with merchants that spans a period of time. For example, the merchant analytics computing device may receive and process transaction data for a merchant or sector that spans between one month and at least two years prior to the date of receipt. Accordingly, the merchant analytics computing device may generate the analytics as functions of time. For example, a growth score might be meaningless if there were no transaction data for a past date from which to determine relative growth. In the example embodiment, the merchant analytics computing device generates analytics for each merchant and/or sector using a period of time, for example, 12 months' or one year's worth of transaction data for the merchant and/or sector. Accordingly, a growth score is representative of the growth of the sector over the past year, the stability score is representative of the stability of the sector over the past year, etc.

In other embodiments, the merchant analytics computing device may be further configured to determine a "spot" score of any of the above-described scores, wherein a "spot" score refers generally to a score calculated for a shorter period of time, for example, three months as opposed to twelve months. The spot score may be used to determine changes in the characteristics of the merchant over a short period of time that may be masked or hidden when scoring the merchant over a year. If a merchant debuted a new, highly anticipated product two months ago, a dramatic increase in sales growth over those two months may be dulled by looking at the full year's growth. As another example, if a sector (e.g., a particular city neighborhood) enacted multiple marketing campaigns over the course of a year, it may be difficult to determine which particular campaign was the most effective at increasing traffic, if transaction data of the entire year is used to score the sector.

The merchant analytics computing device may determine a stability score for a merchant using the received transaction data over a period of time (e.g., a year). The stability of a merchant is a metric or analytic of the volatility of the merchant's cash flow. The merchant analytics computing device may determine an average sales revenue for the merchant over a year or may receive an average sales revenue for the merchant (which may be an "expected" average sales revenue or other value received from a user associated with the merchant or may be retrieved from a database). The merchant analytics computing device may then determine a range around that average (e.g., one standard deviation, a certain percentage or fraction of the average, or any other suitable range) which indicates stable sales revenue.

Using aggregated transaction data, the merchant analytics computing device identifies whether the merchant had sales revenue within that range. Falling outside of the range indicates less stable sales revenue and lowers the ranking of the merchant in terms of stability. The merchant analytics computing device may use monthly transaction data to determine, at each month, whether the merchant had sales revenue within the predetermined range. Alternatively, the merchant analytics computing device may use transaction data from any other interval (i.e., each week, every two weeks, over the year, etc.) to determine the stability of the sales revenue of the merchant.

As the stability score is a relative ranking, the merchant analytics computing device may compare the determined stability of each merchant prior to providing the numerical stability score for each merchant. The merchant analytics computing device may then use the stability scores of all of the merchants in a sector to determine an aggregated stability score for the sector (e.g., an average or weighted average of the merchant stability scores for the merchants within the sector). Alternatively, the merchant analytics computing device may use the determined stability of each merchant in a sector to determine an aggregated stability score for the sector and may subsequently compare sectors. The merchant analytics computing device may then provide the (numerical) stability score for the sector.

According to various aspects, a ping response from a customer device may include a unique identification of the device, for example, the device's respective media access control (MAC) identification (ID), and the like. The traffic analyzing computing device may extract the unique ID of a customer device from a ping response and pair the unique ID of the customer device with data included in the ping response. Also, the computing device may periodically continue to ping the customer device while the customer device is present at the merchant location. As a result, the computing device may detect a round of ping response that occur over a period of time corresponding to when the customer enters a service area of the merchant computer until the customer leaves the service are of the merchant computer.

Accordingly, the computing device may determine an amount of responses received from a customer device based on the unique ID included in the ping responses, and calculate an amount of time that a customer device is located at or near the merchant store (i.e., within range of the wireless network offered by the merchant). Also, by pairing a number of pings to a unique device ID, a merchant may obtain a better idea of the customer traffic pattern by the hour of day and the day of week.

For example, customer traffic data may be analyzed to provide merchants with potential customer spending information and customer habits. The traffic analyzing computing device may be or may be controlled by a merchant computer, a cloud computing environment, a financial entity such as a payment processor, and the like. Based on the unique device ID of a customer device, the traffic analyzing computing device may determine data about the customer device. For example, the computing device may determine a manufacturer of the customer device, a device type of the customer device (i.e. model name), a web browser being used by the customer device, and the like, based on the unique ID. In addition to the unique ID of the customer device, an amount of time at which the customer device was located at or near the merchant may be determined by the pings. The amount of time may also be analyzed, for example, to determine average customer traffic over a period of time at specific times of the day, days of the week, and the like.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for analyzing customer traffic at a merchant location. In this example, the computing device may include a memory device and a processor in communication with the memory device, and when executed by said processor the computer-executable instructions may cause the processor to perform a method such as the method described and illustrated in the example of FIG. 3.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for analyzing customer traffic data at a merchant location, the method implemented on a merchant server configured to provide access to a WiFi network associated with a merchant, the method comprising:

periodically transmitting pings within a coverage area of the WiFi network associated with the merchant located at the merchant location, the pings transmitted using a transmitter of the merchant server, wherein each ping includes an Internet Control Message Protocol (ICMP) echo request packet;

in response to the transmitting, receiving, using a receiver of the merchant server, ping responses from one or more customer devices corresponding to one or more customers located within the coverage area of the WiFi network, wherein each ping response includes an ICMP echo reply packet;

extracting, using an analyzer of the merchant server, a unique device identifier from each received ping response over a period of time, each of the unique device identifiers identifying a different customer device that transmitted the ping response;

determining, using a processor of the merchant server, device information of the one or more customer devices based on the respective unique device identifier extracted from each ping response, the device information including a manufacturer and a model corresponding to each of the one or more customer devices;

estimating, using the processor of the merchant server, a first amount of customer traffic at the merchant location, over the period of time, based on the unique device identifiers extracted during the period of time, wherein estimating the first amount of customer traffic comprises:
  a) identifying multiple ping responses received during the period of time that have the same unique device identifier;
  b) analyzing time stamps from the multiple ping responses to determine (i) a start ping response received from the one or more customer devices associated with the one or more customers and (ii) a stop ping response received from the one or more customer devices; and
  c) estimating an amount of time that the one or more customers spend at the merchant location by subtracting a second of the time stamps associated with the stop ping response from a first of the time stamps associated with the start ping response;

outputting an indication of the estimated first amount of customer traffic at the merchant location over the period of time;

estimating, using the processor of the merchant server, a second amount of customer traffic at the merchant location over a second period of time by repeating steps a) through c) for the second period of time;

notifying, by the merchant server, the merchant in real-time of a deviation in the first amount of customer traffic and the second amount of customer traffic; and calculating a merchant stability score based on a plurality of merchant analytic s including an analytic for the estimated first amount of customer traffic and the estimated second amount of customer traffic at the merchant location that occurs over the period of time and the second period of time.

2. The method of claim 1, wherein each of the unique device identifiers comprises a media access control (MAC) address of a corresponding customer device of the one or more customer devices.

3. The method of claim 1, wherein estimating the first amount of customer traffic at the merchant location further comprises calculating a number of unique device identifiers extracted during the period of time, and estimating that an amount of customers at the merchant location during the period of time is equal to the number of unique device identifiers extracted during the period of time.

4. The method of claim 1, further comprising averaging the estimated amount of time that each customer device spends at the merchant location to determine an average amount of time the one or more customers spend at the merchant location.

5. The method of claim 1, further comprising determining spending profile data about the one or more customers based on the device information of the one or more customer devices.

6. The method of claim 1, further comprising remotely storing the estimated first amount of customer traffic that occurs at the merchant location over the period of time in a cloud computing environment.

7. The method of claim 1, further comprising displaying an interaction interface, on a merchant device, which includes a display of the merchant stability score and allows a user to change data within.

8. A merchant server configured to provide access to a WiFi network associated with a merchant, the merchant server comprising:
  a transmitter configured to periodically transmit pings within a coverage area of the WiFi network associated with the merchant located at a merchant location, wherein each ping includes an Internet Control Message Protocol (ICMP) echo request packet;
  a receiver configured to receive ping responses from one or more customer devices corresponding to one or more customers located within the coverage area of the WiFi network, wherein each ping response includes an ICMP echo reply packet;
  an analyzer configured to extract a unique device identifier from eachreceived ping response over a period of time, each of the unique device identifiers identifying a different customer device that transmitted the ping response;
  a processor configured to:
    determine device information of the one or more customer devices based on the respective unique device identifier extracted from each ping response, the device information including a manufacturer and a model corresponding to each of the one or more customer devices;
    estimate a first amount of customer traffic at the merchant location, over the period of time, based on the unique device identifiers extracted during the period of time, wherein estimating the first amount of customer traffic includes:
      a) identifying multiple ping responses received during the period of time that have the same unique device identifier;
      b) analyzing time stamps from the multiple ping responses to determine (i) a start ping response received from the one or more customer devices associated with the one or more customers and (ii) a stop ping response received from the one or more customer devices; and
      c) estimating an amount of time that the one or more customers spend at the merchant location by subtracting a second of the time stamps associated with the stop ping response from a first of the time stamps associated with the start ping response;
    output an indication of the estimated first amount of customer traffic at the merchant location over the period of time;
    estimate a second amount of customer traffic at the merchant location over a second period of time by repeating steps a) through c) for the second period of time;
    notify the merchant in real-time of a deviation in the first amount of customer traffic and the second amount of customer traffic; and calculate a merchant stability score based on a plurality of merchant analytics including an analytic for the estimated first amount of customer traffic and the estimated second amount of customer traffic at the merchant location that occurs over the period of time and the second period of time.

9. The merchant server of claim 8, wherein each of the unique device identifiers comprises a media access control (MAC) address of a corresponding customer device of the one or more customer devices.

10. The merchant server of claim 8, wherein the processor is further configured to estimate the first amount of customer traffic at the merchant location by calculating a number of unique device identifiers extracted during the period of time, and estimating that an amount of customers at the merchant location during the period of time is equal to the number of unique device identifiers extracted during the period of time.

11. The merchant server of claim 8, wherein the processor is further configured to calculate spending profile data about the one or more customers based on the device information of the one or more customer devices.

12. The merchant server of claim 8, wherein the processor is further configured to remotely store the estimated first amount of customer traffic that occurs at the merchant location over the period of time in a cloud computing environment.

13. A non-transitory computer-readable storage medium having computer-executable instructions embodied thereon that when executed by a merchant server configured to provide access to a WiFi network associated with a merchant, the computer-executable instructions cause the merchant server to perform a method for analyzing customer traffic data at a merchant location, the method comprising:
   periodically transmitting pings within a coverage area of the WiFi network associated with the merchant located at the merchant location, the pings transmitted using a transmitter of the merchant server, wherein each ping includes an Internet Control Message Protocol (ICMP) echo request packet;
   in response to the transmitting, receiving, using a receiver of the merchant server, ping responses from one or more customer devices corresponding to one or more customers located within the coverage area of the WiFi network, wherein each ping response includes an ICMP echo reply packet;
   extracting, using an analyzer of the merchant server, a unique device identifier from each received ping response over a period of time, each of the unique device identifiers identifying a different customer device that transmitted the ping response;
   determining, by the merchant server, device information of the one or more customer devices based on the respective unique device identifier extracted from each ping response, the device information including a manufacturer and a model corresponding to each of the one or more customer devices;
   estimating, by the merchant server, a first amount of customer traffic at the merchant location, over the period of time, based on the unique device identifiers extracted during the period of time, wherein estimating the first amount of customer traffic comprises:
      a) identifying multiple ping responses received during the period of time that have the same unique device identifier;
      b) analyzing time stamps from the multiple ping responses to determine (i) a start ping response received from the one or more customer devices associated with the one or more customers and (ii) a stop ping response received from the one or more customer devices; and
      c) estimating an amount of time that the one or more customers spend at the merchant location by subtracting a second of the time stamps associated with the stop ping response from a first of the time stamps associated with the start ping response;
   outputting an indication of the estimated first amount of customer traffic at the merchant location over the period of time;
   estimating, by the merchant server, a second amount of customer traffic at the merchant location over a second period of time by repeating steps a) through c) for the second period of time;
   notifying, by the merchant server, the merchant in real-time of a deviation in the first amount of customer traffic and the second amount of customer traffic; and
   calculating, by the merchant server, a merchant stability score based on a plurality of merchant analytics including an analytic for the estimated first amount of customer traffic and the estimated second amount of customer traffic at the merchant location that occurs over the period of time and the second period of time.

* * * * *